Patented Oct. 14, 1952

2,614,121

UNITED STATES PATENT OFFICE

2,614,121

PROCESS FOR MAKING INTERMEDIATES FOR PRODUCING BASIC COMPOUNDS

Charles C. Price, South Bend, Ind., and Royston M. Roberts, Austin, Tex., assignors to the United States of America as represented by the Secretary of the Army No Drawing. Original application March 1, 1946, Serial No. 651,432. Divided and this application March 10, 1950, Serial No. 149,014

4 Claims. (Cl. 260—471)

The present invention relates to formamidines and more particularly to a new and improved method of converting diarylformamidines to certain beta-arylaminoacrylates or their corresponding isomeric anils for use in the synthesis of 4-hydroxyquinoline compounds.

These may be used for the preparation of 4-chloroquinolines which in turn may react with substances containing the hydroxyl, sulfhydryl or amino group to form quinolines containing an ether, thioether or amine group at position four. A number of compounds of the latter type are of value as antimalarial drugs (see, e. g., Andersag, Breitner and Jung, U. S. Pat. No. 2,233,970) and their preparation as disclosed utilizes a 4-chloroquinoline intermediate.

As pointed out in the pending application of Price, Roberts and Herbrandson, Ser. No. 597,584, filed June 4, 1945 (Invention Disclosure OSRD-3834), beta-phenylaminoacrylates of the type I, or their corresponding isomeric anils I-A

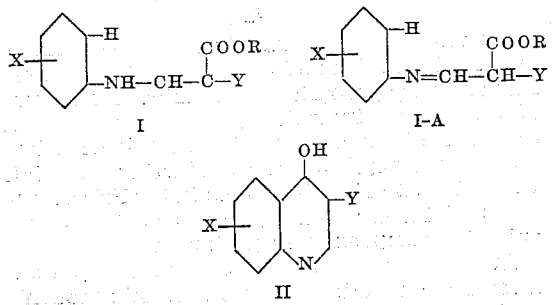

where X is a nuclear substituent and Y is a carbalkoxy group (—COOR), a cyano group (—CN), or a carbanilino group (—CONHAr), may be cyclized under appropriate conditions to form substituted 4-hydroxyquinoline compounds of the type (II).

The preparation of aminoacrylates (I or I-A) above has been accomplished previously by condensation of ethoxymethylenemalonic ester or ethoxymethylenecyanoacetic ester with arylamines (Claisen and Haase, Ann., 297, 75 (1897); Gould and Jacobs, Jour. Amer. Chem. Soc., 61, 2890 (1939); Price, Roberts and Herbrandson) to give I with Y=COOR or CN by condensation of diarylformamidines with active methylene compounds (Dains, Malleis and Myers, Jour. Amer. Chem. Soc., 35, 970 (1913); Snyder and Jones, U. S. Applications Nos. 597,586 and 597,587, filed June 4, 1945, OSRD Disclosure Nos. 3835 and 3836 to give I with Y=CN or CONHAr.

The cyclized products (II) may be hydrolyzed to the corresponding carboxylic acids (III) and the latter readily decarboxylated to form the 4-hydroxyquinoline compounds of the type (IV), the latter being useful as intermediates in the preparation of certain compounds of high antimalarial activity (Andersag, Breitner and Jung).

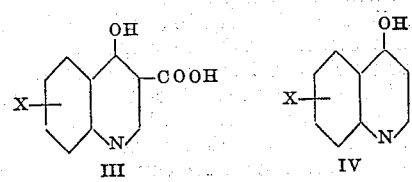

The conditions necessary to effect the cyclization step in the foregoing synthesis depend upon the nature of the Y group present in the starting materials (I or I-A). In the case where Y is a carbalkoxy group (—COOR), cyclization of (I) or (I-A) to form (II) is readily accomplished in high yields merely by heating the diester, either by itself or in solution or suspension in a suitable high boiling heat exchange medium or solvent, to a temperature of the order of about 250° C. However, in the case of the cyano compounds (i. e., Y=—CN in I or I-A) or of the carbanilino compounds (i. e., Y=CONHAr in I or I-A), cyclization requires the use of a very large proportion of reaction solvent (i. e., high dilution) during the heating step, in order to obviate the production of a tarry reaction product. For this reason, the diester compound (Y=—COOR in I or I-A) constitute somewhat more satisfactory starting materials than the corresponding cyano or carbanilino compounds.

The group Y in I is of importance when the group X in the aryl residue is such that cyclization may proceed to form two isomers. For example, when X is a chlorine atom in the meta position, cyclization may result in the appearance of the chlorine atom in either the 5- or 7- position of the resulting quinoline. When Y is a negative group, such as COOR, CN or CONHAr, the proportion of the undesirable 5-isomer is very small. On the other hand, cyclization of simple beta-(m-chloroanilino)-acrylates (Y=H in I) (Price and Reitsema, U. S. Application No. 597,585, filed June 4, 1945, OSRD Disclosure No. 3850) or of beta-carbethoxy-beta-(m-chloranilino)acrylates (Surrey and Hammer, Jour. Amer. Chem. Soc., 68, 113 (1946) produces a considerable proportion of the 5-isomer.

The conditions necessary to bring about the hydrolysis of the cyclized product (II) to the corresponding carboxylic acid (III) also depend upon the nature of the Y group in the former. Thus where Y is a carbalkoxy group, hydrolysis is readily accomplished by means of hot aqueous alkali, whereas in the case of the corresponding cyano or carbanilino compounds, much more strenuous hydrolytic conditions (e. g., 75% aqueous $H_2SO_4$) are required.

For the reasons indicated above, other things being equal, the diesters (Y=—COOR in I or I-A) represent the most attractive starting materials for the synthesis of various 4-hydroxyquinoline-3-carboxylic acids or their derivatives in accordance with the method indicated. However, for large scale applications, the use of these diesters (Y=—COOR in I or I-A) in the preparation of quinoline compounds has heretofore been restricted because of the limited availability of the raw materials necessary for the synthesis of the diesters in accordance with the best prior art method (i. e., condensation of the appropriate aniline compounds with ethoxymethylene-malonic ester). Furthermore, the use of ethoxymethylene malonic ester on a commercial scale is objectionable for the additional reason that its pronounced skin-irritant action necessitates extreme handling care to prevent incapacitation of operating personnel. It was therefore evident that the utility of the above described Price, Roberts and Herbrandson synthesis could be greatly increased, particularly insofar as large scale applications were concerned, provided the diester starting materials (Y=—COOR in I or I-A) could be prepared by an improved process which did not involve the use of ethoxymethylene malonic ester as an intermediate.

Broadly speaking, the object of the present invention is to provide a new and improved method of synthesizing 2-N-arylamino-1-carbalkoxyacrylic esters of the type (V) or their corresponding isomeric anils (VI)

ArNH—CH=C(COOR)$_2$
V

ArN=CH— CH(COOR)$_2$
VI by a process that is readily adaptable to large scale manufacture and which starts with readily available raw materials. For purposes of convenience these compounds will hereinafter sometimes be referred to as "arylaminomethylenemalonic esters," this term being understood to include the isomeric anils (VI).

A more specific object is the provision of an improved synthesis of compounds of the type (VII) and (VIII)

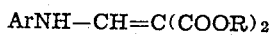
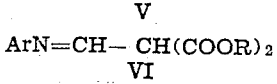
VII

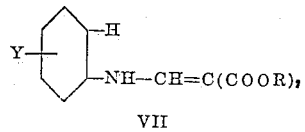
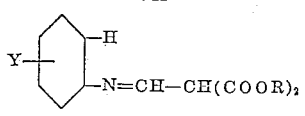
VIII from which 4-hydroxyquinoline compounds, containing one or more substituents (Y) in the benzenoid ring of the quinoline nucleus, may be prepared.

Still another object is to provide an improved method of synthesizing 7-halo-4-hydroxyquinoline compounds of the type (IX), (X) and (XI) and the 4,7-dihaloquinoline compounds of the type (XII)

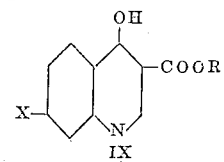
IX

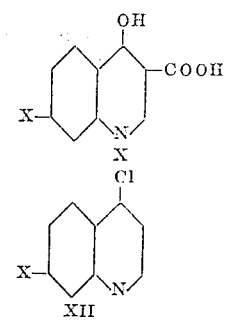
X

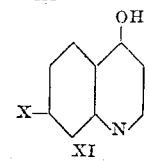
XI

XII

R being an alkyl group and X a halogen group such as fluoro, chloro, bromo or iodo.

Other objects and advantages of the invention will be apparent as the description progresses.

The foregoing objects may be accomplished in accordance with the present invention, which is based upon the discovery that, under the proper conditions to be described later, the reaction between a diarylformamidine (XIII; Ar=aryl) and a malonic ester (XIV; R=alkyl), may be controlled to produce the diester (XV, or its corresponding anil) in good yields, rather than the amide-ester or half-ester (XVI, or its corresponding anil) that is reported to constitute the only reaction product formed from these reactants under all conditions heretofore employed (cf. Dains, Malleis and Meyers, Jour. Amer. Chem. Soc., 35, 970 (1913)).

ArNH—CH=NAr
XIII

ArNH—CH=C(COOR)$_2$
XV

CH$_2$(COOR)
XIV

ArNH—CH=C(COOR)CONHAr
XVI

Inasmuch as the diarylformamidines (XIII) are readily obtainable in high yields from formic acid and the appropriate aryl amine, the process of the present invention provides an excellent synthesis of arylaminomethylenemalonic esters (XV), generally, and of the starting materials (Y=—COOR in I or I-A) used in the Price, Roberts and Herbrandson synthesis of 4-hydroxyquinoline compounds, in particular.

In carrying out the process of the present invention, a reaction mixture containing roughly equimolar proportions of the selected diarylformamidine (XIII) and the malonic ester (XIV) is heated to a temperature and for a time merely sufficient to produce the diester (XV) but insufficient to cause the formation of substantial quantities of the amide-ester (XVI). In other words, the time-temperature relation is so adjusted that the reaction is substantially stopped at the diester stage (XV) rather than the amide-ester or half-ester stage (XVI). In short, the invention is based upon the discovery that the time-temperature relation for the reaction between a diarylformamidine and malonic ester determines the course of the reaction.

Generally speaking, if the reaction mixture is heated from about 2 to about 6 hours at a temperature of about 100° C. to about 125° C., the reaction products consist predominantly of the diester (XV) and the liberated aryl amine (ArNH$_2$); only a small proportion of the half-ester (XVI) is formed under these conditions by the interaction of the first-stage reaction products. If on the other hand the reaction conditions are significantly more strenuous as regards either the time or the temperature of the reaction, the reaction product consists predominantly of the half-ester or ester-amide (XVI). Thus, for example, in the case of the formamidine of m-chloroaniline and diethylmalonate, if the reaction mixture is heated for three hours at 135° C., the reaction proceeds in large measure to the amide-ester stage (XVI), whereas if the same mixture is heated for the same time at 115–125° C., an excellent yield of the diester (XV) will be obtained.

The reaction mixture produced by the process of the present invention may be worked up in various ways depending largely on the use to which the product is subsequently put. Where it is desired to produce diester (XV), substantially free of contamination with the half-ester (XVI), the reaction mixture may be worked up by separating the reaction products and the unreacted starting materials, using any appropriate procedure and then recovering the diester by crystallization from a suitable solvent.

One method of isolation that has been found especially satisfactory is to dissolve the reaction mixture in a water-immiscible solvent (e. g., benzene) and then to treat the solution with aqueous hydrochloric acid. This treatment results in the precipitation of the hydrochloride of any unreacted formamidine and the latter may readily be separated from the two liquid layers. The aqueous liquid layer contains the hydrochloride salt of the aniline compound liberated in the reaction ($ArNH_2 \cdot HCl$), and this may be recovered if desired by evaporation of the aqueous solution to dryness or by other means. The non-aqueous (e. g., benzene) layer contains the diester (XV), excess malonic ester, any half-ester (XVI) as well as the non-aqueous solvent used for cyclization. The volatile components of this mixture (benzene, malonic ester and a small amount of alcohol in some cases) may be recovered by distillation, and the residue, consisting of the diester and perhaps a small amount of the amide-ester, may be readily purified by crystallization from a suitable solvent (e. g., ether, petroleum ether).

If the diester (XV) produced by the process of the present invention is to be employed in the synthesis of 4-hydroxyquinoline compounds, the separation of the diester from any contaminating half-ester need not be carried out prior to the cyclization step; for the crude material obtained as described above, or by the use of a high boiling water-immiscible solvent (e. g., diphenyl ether) in lieu of benzene, may be heated in solution in the high boiling solvent to a temperature of the order of 250° C. Under these conditions, both the diester and the half-ester will cyclize in good yield: the solution, although relatively concentrated in respect to the diester, is relatively dilute in respect to the amide-ester, and therefore the amide-ester as well as the diester cyclizes to the corresponding quinoline compounds. The cyclized reaction product thus obtained, consisting of the quinoline carboxylic ester and a minor proportion of the corresponding anilide may be treated with hot aqueous alkali, which, as previously explained, readily saponifies the ester but leaves the corresponding anilide unchanged. The difference in the reactivity of the ester and the corresponding anilide therefore provides a convenient method for their separation; the anilide may be filtered from the alkaline solution and the latter acidified to liberate the free acid (X). If desired, the unhydrolyzed anilide compound thus recovered may be converted to the acid (X) by treatment with hot 75% aqueous sulfuric acid; as a result of this expedient, the by-product (half-ester) of the main preparative reaction is usefully employed to augment the yield of acid, yet special precautions regarding dilution during cyclization are not necessary because of the minor extent to which the half-ester is produced in the formation of the diester by the process of the present invention.

In order more clearly to disclose the nature of the present invention, two specific examples, illustrating preferred application of the principles discussed above, will hereinafter be described in considerable detail. It should be clearly understood, however, that these examples are presented solely for the purposes of illustration; they are not intended either to delineate the scope of the invention or to limit the ambit of the appended claims.

EXAMPLE I

The reactions involved may be represented by the following scheme:

$$m-ClC_6H_4NH-CH=N-C_6H_4Cl-m + CH_2(COOC_2H_5)_2 \xrightarrow{116-120° C.}$$
(A)

$$m-ClC_6H_4NH-CH=\underline{C(COOC_2H_5)_2} + m-ClC_6H_4NH_2$$
(E)                                                   (B)

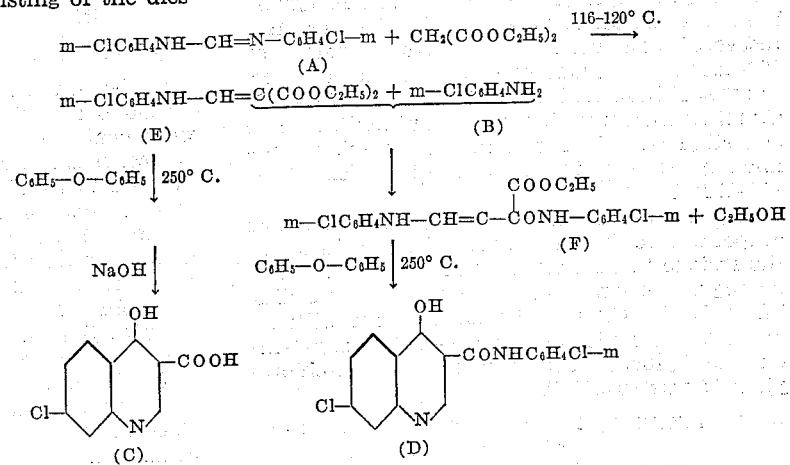

In this example, ethyl-α-carbethoxy-β-m-chlorophenyl-formamidine (E), obtained from diethyl malonate and di-m-chlorophenyl-formamidine (A), was isolated by extracting the hydrochloric acid-acidified reaction mixture with a volatile, water-immiscible solvent (e. g., benzene), after which the diester was separated by distillation of the volatile components of the solution. The diester thus isolated was then dissolved in a non-volatile solvent (diphenyl ether) and the solution heated to a high temperature to effect cyclization. Thereafter the resulting diphenyl ether solution was directly treated with hot aqueous alkali to saponify the quinoline-3-carboxylic acid ester present in the solution. The aqueous alkaline solution was then separated from the diphenyl ether solution and the former acidified to liberate the free quinoline-3-carboxylic acid (C).

(a) PREPARATION OF THE DIESTER

In a 50-cc. Erlenmeyer flask were placed 13.3 g. (0.05 mole) of di-m-chlorophenylformamidine and 8.0 g. (0.05 mole) of diethyl malonate. The flask was heated in an oil bath at 116–120° C. (inside temperature) for three and one-half hours. To the reaction mixture was then added 20 cc. of 10% aqueous hydrochloric acid and 10 cc. of benzene. The insoluble hydrochloride of unchanged di-m-chlorophenylformamidine which precipitated was collected by vacuum filtration after the mixture had been shaken vigorously. An additional 20 cc. of benzene was added to the filtrate, the mixture was transferred to a separatory funnel, and the layers were separated. The aqueous solution was extracted with an additional 25-cc. portion of benzene. The combined benzene extracts were washed with 20 cc. of water, which was then added to the main aqueous acid solution (Note 1).

The benzene solution was distilled at atmospheric pressure and finally at reduced pressure (Note 2). To the residue was added 10 cc. of ether and 25 cc. of low boiling petroleum ether and the solution was cooled in an acetone-dry ice mixture. After one and one-half hours the mixture was filtered and 6.3 g. (Note 3) of very fine white needles were collected; M. P. 48–49° C. This product was shown to be ca. 90% of the diester (Ar=m-chlorophenyl in XV) and ca. 10% of the corresponding half-ester (Ar=m-chlorophenyl in XVI), this being established by (1) recrystallization and (2) cyclization. Hence, the yield of the pure diester was about 38%, neglecting the starting materials recovered.

(b) RECRYSTALLIZATION OF THE PRODUCT

A 1.0-g. sample of the product was recrystallized from 12 cc. of 95% ethanol. The crystals recovered amounted to 0.10 g. and melted at 102–103° C. A second recrystallization from 5 cc. of ethanol brought the melting point to 112–113° C.; mixed melting point with an authentic sample of ethyl-α-m-chlorocarbanilido-β-m-chloroanilinoacrylate (Ar in XVI=m-chlorophenyl was 112–113° C.

The filtrate from the first recrystallization was evaporated to dryness at room temperature and the residue was recrystallized from 10 cc. of low boiling petroleum ether to give fine white needles, M. P. 53–54° C.; mixed melting point with an authentic sample of ethyl-α-carbethoxy-β-m-chloroanilyinoacrylate (Ar in XV=m-chlorophenyl) was 53–55° C.

(c) CYCLIZATION, HYDROLYSIS AND DECARBOXYLATION

A 3.0-g. sample of the crude product obtained from (a) was melted, added to 9 cc. of boiling diphenyl ether in a 50-cc. round-bottomed flask, and washed in with another cubic centimeter of hot solvent. The crystals which separated after three or four minutes soon filled the mixture, and the heating was only continued fifteen minutes. On cooling, the reaction mixture set to a solid light yellow mass. To this was added 10 cc. of 10% sodium hydroxide solution and the mixture was heated under reflux for twenty minutes. When the two-phase liquid mixture cooled, a precipitate appeared in the aqueous layer; this was collected by filtration and amounted to 0.3 g. It melted at 290–305° C. (uncor.) and consisted of 3-m-chlorocarbanilido-4-hydroxy-7-chloroquinoline (X=7-chloro; Y=m-chlorocarbanilido in II).

Ether was added to the filtrate and the layers were separated. The aqueous layer was extracted with another 10-cc. portion of ether and then neutralized with 10% hydrochloric acid. The white precipitate thus obtained was digested by heating the suspension to boiling, after which the mixture was cooled and the precipitate was collected on a filter. After drying in vacuo the weight of the acid was 1.6 g. (79% of the theoretical amount, assuming the starting material to be 90% diester); M. P. 253° C. (uncor.) with loss of carbon dioxide. One gram of this acid was decarboxylated to 4-hydroxy-7-chloroquinoline in accordance with the procedure described in the above identified Price, Roberts and Herbrandson application. The recrystallized product was found to be identical with an authentic sample of 4-hydroxy-7-chloroquinoline.

Notes 1. m-Chloroaniline produced by the reaction was isolated from the dilute hydrochloric acid solution by neutralization with ammonium hydroxide and extraction of the alkaline mixture with ether. The identity of the crude amine (ca. 2.6 g.) was proved by conversion to the benzene-sulfonamide; melting point of the unrecrystallized derivative, (118–119° C.). (Literature, 121° C.).

2. Any unchanged malonic ester is removed by distillation at reduced pressure.

3. Addition of more low boiling petroleum ether to the filtrate and further cooling produced an oil which crystallized on standing to yield 0.8 g. of crude yellow crystals.

EXAMPLE II

*Preparation of 4,7-dichloroquinoline from N,N'-Di-m-chlorophenylformamidine*

(a) PREPARATION OF THE DIESTER

N,N'-Di-m-chlorophenylformamidine (79.5 g. 0.3 mole) and diethyl malonate (48 g., 0.3 mole) were heated with agitation for ten hours in a 200-cc. flask. The temperature of the reaction mixture was maintained at 100–105° C. At the end of this time, the mixture was cooled and diluted with 500 cc. of benzene. The solution was agitated and, with external cooling, there was added 10 g. of filter cel and 30 cc. of concentrated hydrochloric acid. After agitating for fifteen minutes, the mixture was filtered through a 10-g. pad of filter cel. The filter cake was slurried with 125 cc. of benzene and filtered. The new cake (A) was washed with 50 cc. and then with 35 cc. of benzene. All the benzene solutions were combined.

(b) CYCLIZATION AND HYDROLYSIS

Dowtherm (225 cc.) was added to the benzene solution and the mixture was distilled until the temperature of the reaction mixture reached 245° C. The downward condenser was replaced by a return air condenser and heating was continued with agitation for forty-five minutes at a temperature of 245–250° C.

The mixture was cooled to 100° C., 450 cc. of 10% sodium hydroxide was added, and hydrolysis was effected by refluxing with agitation for three hours. At the end of this time, the aqueous phase was separated from the Dowtherm layer-temperature 90–95° C.

The aqueous layer was allowed to cool to room temperature and then diluted to 1 liter. The solid anilide, 3-m-chlorocarbanilido-4-hydroxy-7-chloroquinoline which had precipitated, was recovered by filtration, washed with three 100-cc. portions of water which were added to the main filtrate, and dried at 110° C. It weighed 5.0 g. and melted at 308–313° C. (uncor.). This material can be hydrolyzed by means of 70% sulfuric acid to give 7-chloro-4-hydroxyquinoline-3-carboxylic acid and m-chloroaniline.

The filtrate was made acid to Congo red with 50° Bé sulfuric acid. The 7-chloro-4-hydroxyquinoline-3-carboxylic acid (b) was isolated by filtration, washed with water until the washings were neutral, and dried at 110° C. It weighed 40 g. and melted with decomposition at 240–248° C. (uncor.).

(c) m-CHLOROANILINE RECOVERY

The dried cake (A) containing formamidine hydrochloride and m-chloroaniline hydrochloride was refluxed with a mixture of 37 cc. of 50° Bé sulfuric acid and 1350 cc. of water for three hours. The mixture was cooled and made alkaline with 50° Bé sodium hydroxide and the m-chloroaniline was recovered by steam distillation. The oil which separated weighed 29.8 g. Titration with standard sodium nitrate indicated the presence of an additional 11.4 g. of m-chloroaniline in the aqueous layer.

(d) DECARBOXYLATION AND CONVERSION TO 4,7-DICHLOROQUINOLINE

Dowtherm (280 cc.) was heated to 225–230° C. and, with agitation, 39.5 g. of the 7-chloro-4-hydroxyquinoline-3-carboxylic acid (b) was added over a forty-minute period. Heating at 225–230° C. was maintained until a homogeneous solution was obtained.

The mixture was cooled to 90° C. and 56 g. of phosphorus oxychloride was added. The mixture was agitated for one hour at 90–100° C. Then, after cooling to 15° C., 280 cc. of water was added. Rapid agitation was maintained for one hour while the temperature was kept at 15° C. The aqueous layer was separated and the Dowtherm layer was washed with 100 cc. of 50° Bé sulfuric acid.

The wash was combined with the main aqueous layer and the mixture was diluted to 1 liter. The solution was clarified by agitation with 5 g. of filter cel followed by sludge filtration. The clear filtrate was made alkaline to Brilliant yellow with 50° Bé sodium hydroxide. The crude 4,7-dichloroquinoline was isolated by filtration, washed with three 100-cc. portions of water and dried in an oven at 50° C. It weighed 27.6 g. and melted at 75–80° C. (uncor.).

The crude dichloroquinoline was recrystallized from "Skellysolve C." The first crop of crystals weighed 11.0 g. and melted at 82–85° C. The second crop weighed 6.8 g. and melted at 82–84° C. The third crop weighed 3.0 g. and melted at 79–82° C. The residue weighed 4.5 g. and melted at 59–66° C.

It may be of interest to point out the advantages of the present process as applied to the preparation of 7-chloro-4-hydroxyquinoline-3-carboxylic acid, as contrasted to certain limitations of the four best methods heretofore available for the production of this compound; namely, the procedures described in: (1) the Price, Roberts and Herbrandson application, Ser. No. 597,584, filed June 4, 1945 (Invention Disclosure OSRD–3834); (2) Snyder and Jones application, Ser. No. 597,586, filed June 4, 1945 (Invention Disclosure OSRD–3835); (3) Snyder and Jones application, Ser. No. 597,587, filed June 4, 1945 (Invention Disclosure OSRD–3836); and (4) Price and Reitsema application, Ser. No. 597,585, filed June 4, 1945 (Invention Disclosure OSRD–3850).

Considering these prior processes seriatim, the starting materials of the present invention are much more economical and readily available than those heretofore required for carrying out the Price, Roberts and Herbrandson process, and the over-all yield of 7-chloro-4-hydroxyquinoline-3-carboxylic acid is better. The essential difference in raw materials is the use of inexpensive, readily-available formic acid in place of ethyl orthoformate (which requires chloroform and sodium). The principal disadvantage in the cyclization of the anilide anils or the cyano anils described in the two Snyder and Jones applications is the high dilution necessary for satisfactory yields. A second drawback is the necessity of acid rather than alkaline hydrolysis of the cyclized product, which introduces several operational difficulties. The new process of the present invention yields a product that can be cyclized in better yield at high concentrations, yielding a product which may be directly hydrolyzed by alkali without filtration from the solvent used for cyclization. The advantages of the present process over that described in the Price and Reitsema application are in the over-all yield and the economy of starting materials. The preparation of the starting material used in the Price and Reitsema process requires sodium and esters of acetic and formic acid. The condensation to form methyl formylacetate gives yields reported in the range of 70–80% but its condensation with m-chloroaniline is somewhat difficult to carry out and has not been accomplished in very good yields. It will then be apparent that the process of the present invention is characterized by a number of advantages over the most satisfactory methods heretofore available for preparing substituted 4-hydroxy-quinoline compounds.

We are aware of the fact that Dains et al., Jour. Amer. Chem. Soc., 35, 970 (1913), extensively studied the interaction of diaryl formamidines of the type R—N=CH—NHR with various active methylene compounds of the type $CH_2(X)(Y)$, including malonic ester, cyanoacetic ester and the like. These investigators postulated that in the case of malonic ester the reaction necessarily proceeded through the diester to the half ester, as indicated by the following scheme:

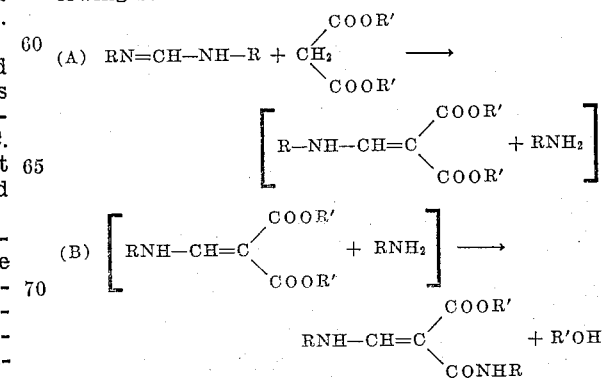

However, they pointed out that, although in the case of active methylene compounds other than malonic ester, first-stage reaction products could be isolated, in the case of malonic ester, "this secondary reaction seems always to occur." This observation suggested that in the case of malonic ester, the rate of the secondary reaction in this instance was too great to enable the isolation of the postulated intermediate. It will be evident that the process of the present invention is based upon the discovery of the critical reaction condition necessary to enable the isolation in good yields of a compound that has heretofore merely been postulated as a necessary but transitory intermediate.

In the above described specific examples the process of the present invention was illustrated by its application to the preparation of ethyl-α-carbethoxy-β-m-chloroanilinoacrylate and the conversion of the latter to 7-chloro-4-hydroxyquinoline-3-carboxylic acid. However, the principles involved are broadly applicable to the interaction of malonic esters with diarylformamidines, generally, including those wherein the aryl nuclei of the formamidine comprises, for instance, a substituted phenyl radical having substituents such as alkyl (e. g., methyl, etc.), alkoxy (e. g., methoxy, ethoxy, etc.), aryloxy (e. g., phenoxy, etc.), benzo, carbalkoxy (e. g., carbethoxy), cyano, nitro and the like. In addition, it is evident that cyclization media other than diphenyl ether may be used if desired; for example, other high boiling solvents or heat exchange media such as high boiling hydrocarbons may be used to carry out this step, or indeed the solvent may be dispensed with entirely. Many other variations, modifications and extensions of the principles illustrated in the foregoing specific examples will be apparent to those skilled in the art. We therefore intend to be limited only in accordance with the appended patent claims. This application is a division of our copending application Serial Number 651,432, filed March 1, 1946 for Method of Manufacturing Certain Basic Compounds.

Having thus described our invention, what we claim as new and wish to secure by Letters Patent is:

1. A method of producing arylaminomethylene malonic esters selected from the group consisting of compounds of the type ArNH—CH=C(COOR)$_2$ and their isomeric anils ArN=CH—CH(COOR)$_2$, which comprises heating a reaction mixture containing approximately equimolar proportions of a malonc ester of the type CH$_2$(COOR)$_2$ and a diarylformamidine of the type ArNH—CH=NHAr to a temperature between about 100° C. to about 125° C. for a period of about two hours to about six hours, thereby producing a substantial proportion of said arylaminomethylene malonic ester but insufficient to produce a substantial proportion of the amide-ester derivative of said malonic ester; the R group in the foregoing formulae representing a lower alkyl radical and the Ar group a monocyclic aryl radical.

2. The method of claim 1 wherein said diarylformamidine comprises a formamidine of the type

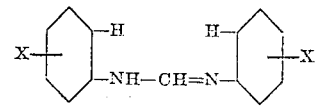

where X is a monovalent halogen nuclear substituent.

3. The method of claim 1 wherein the reaction mixture resulting from said heating step is mixed with aqueous hydrochloric acid and a water-immiscible solvent for the desired arylaminomethylene malonic ester, after which the resulting non-aqueous solution in said water-immiscible solvent is separated from the aqueous solution and also from any undissolved solid material.

4. The method of claim 1 wherein the reaction mixture resulting from said heating step is mixed with aqueous hydrochloric acid and a volatile, water-immiscible solvent for the desired arylaminomethylene malonic ester, after which the resulting non-aqueous solution in said water-immiscible solvent is separated from the aqueous solution and also from any undissolved solid material, and the volatile components of said separated non-aqueous solution are separated from the solute.

CHARLES C. PRICE.
ROYSTON M. ROBERTS.

REFERENCES CITED

The following references are of record in the file of this patent:

Beilstein, Handbuch Der Organischen Chemie, Vierte Auflage, vol. 13, page 532.